United States Patent [19]

Gordon

[11] Patent Number: 5,421,607
[45] Date of Patent: Jun. 6, 1995

[54] AIR BAG ATTACHMENT MECHANISM

[75] Inventor: John E. Gordon, Brookville, Ohio

[73] Assignee: General Motors Corporation, Detroit, Mich.

[21] Appl. No.: 260,132

[22] Filed: Jun. 15, 1994

[51] Int. Cl.⁶ .............................................. B60R 21/16
[52] U.S. Cl. .................................. 280/728.2; 280/743.1
[58] Field of Search ............ 280/743 R, 728 A, 728 R, 280/731

[56] References Cited

U.S. PATENT DOCUMENTS

| | | | |
|---|---|---|---|
| 3,944,251 | 3/1976 | Lunch | 280/743 R |
| 4,877,264 | 10/1989 | Cuevas | 280/731 |
| 5,064,218 | 11/1991 | Hartmeyer | 280/743 R |
| 5,131,677 | 7/1992 | Horiuchi et al. | 280/731 |
| 5,141,247 | 8/1992 | Barth | 280/728 A |
| 5,186,492 | 2/1993 | Wright et al. | 280/743 R |
| 5,205,584 | 4/1993 | Honda | 280/743 R |
| 5,277,442 | 1/1994 | Cuevas | 280/731 |
| 5,320,379 | 6/1994 | Burnad et al. | 280/728 A |
| 5,344,182 | 9/1994 | Lauritzen et al. | 280/728 A |
| 5,354,093 | 10/1994 | Schenck et al. | 280/728 A |

Primary Examiner—Margaret A. Focarino
Assistant Examiner—Christopher Ellis
Attorney, Agent, or Firm—Howard N. Conkey

[57] ABSTRACT

An air bag module includes an air bag having a circular bag opening and a retainer plate including a circular plate opening. A peripheral hem portion surrounds the bag opening. The air bag module also includes a discontinuous circular ring having a first end and a second end which are circumferentially spaced apart to form a circumferential gap. The ring is located within the hem portion of the air bag. The ring has a relaxed position in which the gap is fully open and the ring has a diameter greater than that of the plate opening. The ring also has a deformed position in which the gap is reduced and the deformed ring has a diameter less than that of the plate opening such that the ring and air bag are insertable through the plate opening. Upon insertion of the ring through the plate opening, the ring reopens to the relaxed position and is captured beneath the plate such that the air bag is anchored to the plate and removal of the ring back through the plate opening is prevented.

4 Claims, 2 Drawing Sheets

AIR BAG ATTACHMENT MECHANISM

This invention relates to an air bag assembly, and more particularly to a mechanism for attaching the air bag to a retainer plate of an air bag module.

BACKGROUND OF THE INVENTION

It is well known in motor vehicles to provide an air bag module mounted to a vehicle steering wheel including a hub portion. A typical driver's side air bag module includes an air bag having a circular bag opening and a generally circular inflator positioned partially within the bag opening of the air bag for discharging inflator gas thereinto upon sensing certain predetermined vehicle conditions. Also in the module, the inflator and air bag are housed within a housing and covered by a cover. The module further includes a retainer plate having a circular plate opening. The air bag, inflator, housing and cover are mounted to the retainer plate to form the module. The retainer plate also includes mounting members for mounting the assembled air bag module to the hub portion of the steering wheel.

During assembly of the air bag module, it is desirable to have the air bag mounted to the retainer plate as a separate subassembly such that the retainer plate may then be used to position and support the air bag during the operation of folding the air bag. The mechanism for attaching the air bag to the retainer plate must also anchor the air bag to the retainer plate during air bag inflation. In the prior art, attachment of the air bag to the retainer plate has typically been accomplished by using a multiplicity of fasteners to fasten the air bag to a multiplicity of apertures in the retainer plate. This operation is time-consuming during assembly of the module.

An alternate mechanism has been suggested in the prior art for attaching the air bag to the module without the use of fasteners. This arrangement involves providing a beaded perimeter on the air bag which is preassembled with the inflator by securing the beaded perimeter to an annular groove on the inflator after which the inflator is inserted into and coupled with a cup-shaped retainer which traps the beaded perimeter between the inflator and cup-shaped retainer. However, this air bag attachment method has the disadvantages of requiring a complex cup-shaped retainer, of not being adaptable to existing air bag modules utilizing a retainer plate with a circular opening, and of not having a separate air bag subassembly including the retainer plate which facilitates the air bag folding operation.

SUMMARY OF THE INVENTION

This invention provides an improved mechanism for attaching an air bag to a retainer plate of an air bag module which allows for simple attachment of the air bag to the retainer plate without the use of fasteners, which may be utilized in existing air bag modules having a retainer plate with a circular plate opening, which permits the air bag and retainer plate to be a separate air bag subassembly to facilitate the air bag folding operation, and which anchors the air bag to the module during air bag inflation.

In accordance with the present invention, an air bag module includes an air bag having a circular bag opening and a retainer plate including a circular plate opening. A peripheral hem portion surrounds the bag opening. The air bag module also includes a discontinuous circular ring having a first end and a second end which are circumferentially spaced apart to form a circumferential gap. The ring is located within the hem portion of the air bag. The ring has a relaxed position in which the gap is fully open and the ring has a diameter greater than that of the plate opening. The ring also has a deformed position in which the gap is reduced and the deformed ring has a diameter less than that of the plate opening such that the ring and air bag are insertable through the plate opening. Upon insertion of the ring through the plate opening, the ring reopens to the relaxed position such that the ring is captured beneath the plate to anchor the air bag to the plate and prevent removal of the ring back through the plate opening.

Thus, the present invention provides an improved mounting mechanism in an air bag module which permits simple attachment of an air bag to a retainer plate having a circular plate opening, without the use of fasteners. In addition, assembly time is reduced since the ring may be quickly snapped in through the plate opening whereby removal of the ring back through the plate opening is prevented. Thus, the air bag is securely anchored to the retainer plate of the module during air bag inflation.

Since many existing air bag modules include a retainer plate having a circular plate opening, this improved mounting mechanism advantageously permits utilization of the ring in existing air bag modules to eliminate the multiplicity of fasteners normally used to attach the air bag to the retainer plate. As an additional advantage, the multiplicity of fastening apertures normally required in the retainer plate to receive the fasteners are also eliminated.

Furthermore, using the ring located within the hem portion to mount the air bag to the retainer plate allows the air bag and retainer plate to be a separate air bag subassembly which permits use of the retainer plate to support and position the air bag to facilitate folding the air bag during assembly.

The present invention is characterized by providing simplicity, ease of assembly, and reduction of parts in attachment of an air bag to a retainer plate having a circular plate opening in an air bag module.

BRIEF DESCRIPTION OF THE DRAWINGS

These and other features, objects and advantages of the present invention will become apparent upon consideration of the following description of the preferred embodiment, appended claims, and accompanying drawings in which:

DESCRIPTION OF THE PREFERRED EMBODIMENT

Figure 3:
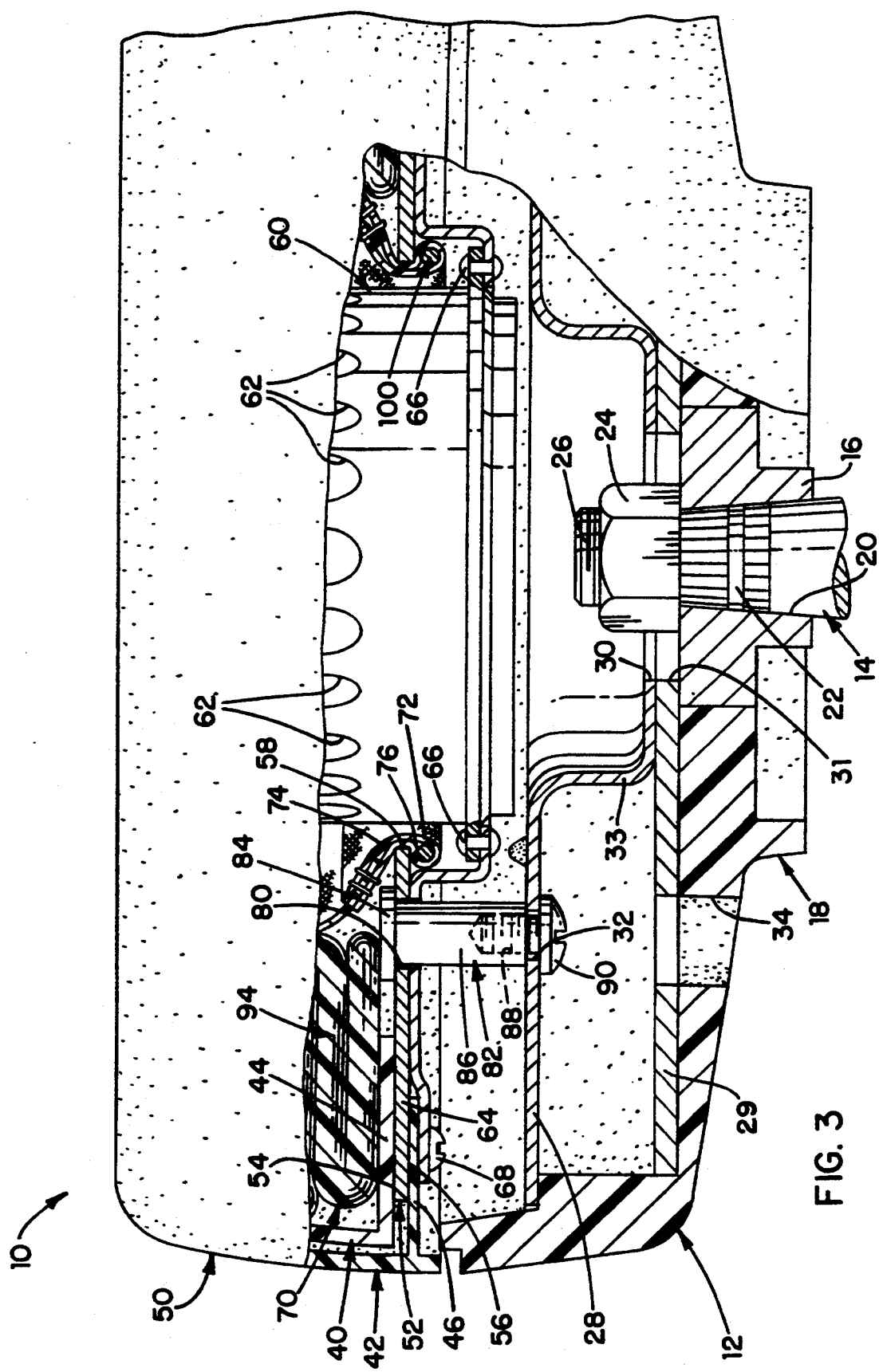
FIG. 3 is a side view of a steering wheel assembly including an air bag module, and showing the steering wheel assembly including the air bag module partially-broken-away.

Referring to FIG. 3, it is seen that a vehicle steering wheel assembly generally designated as 10 includes a hub portion 12 of molded plastic material and a rim portion, not shown, connected to the hub portion 12 by spoke portions, not shown. The hub portion 12 is conventionally mounted on the steering shaft 14 of the vehicle by a mounting portion 16 molded in the base 18 of the hub portion 12 and having a tapered splined opening 20 receiving a like shaped upper portion 22 of the steering shaft 14. A nut 24 is threaded on the threaded end 26 of the steering shaft 14 to securely mount the steering wheel assembly 10 to the vehicle. The base 18 of the hub portion 12 preferably includes a molded-in reinforcement 29 having a central reinforcement opening 31 surrounding the nut 24. The hub portion 12 includes three hub openings 34 extending through the reinforcement 29 and base 18. The hub portion 12 also includes a support plate 28 having a depression 33 which is rigidly welded to the reinforcement 29. The support plate 28 includes three support openings 32 aligned with respective hub openings 34 and a central opening 30 aligned with the central reinforcement opening 31. The support openings 32 and hub openings 34 are preferably evenly spaced apart around the central opening 30 of the support plate 28. As shown in FIG. 3, a driver's side air bag module is generally designated as 50. The component parts of the module 50 include a retainer plate 52, an air bag 70, and a generally cylindrical inflator 60. The inflator 60 and air bag 70 are housed within a housing 40 and covered by a cover 42. The housing 40 and cover 42 each have respective flanges 44, 46 which abut and are suitably secured to the retainer plate 52. The inflator 60, air bag 70, housing 40 and cover 42 are thus modularized with the retainer plate 52 to provide the module 50.

Figure 1:
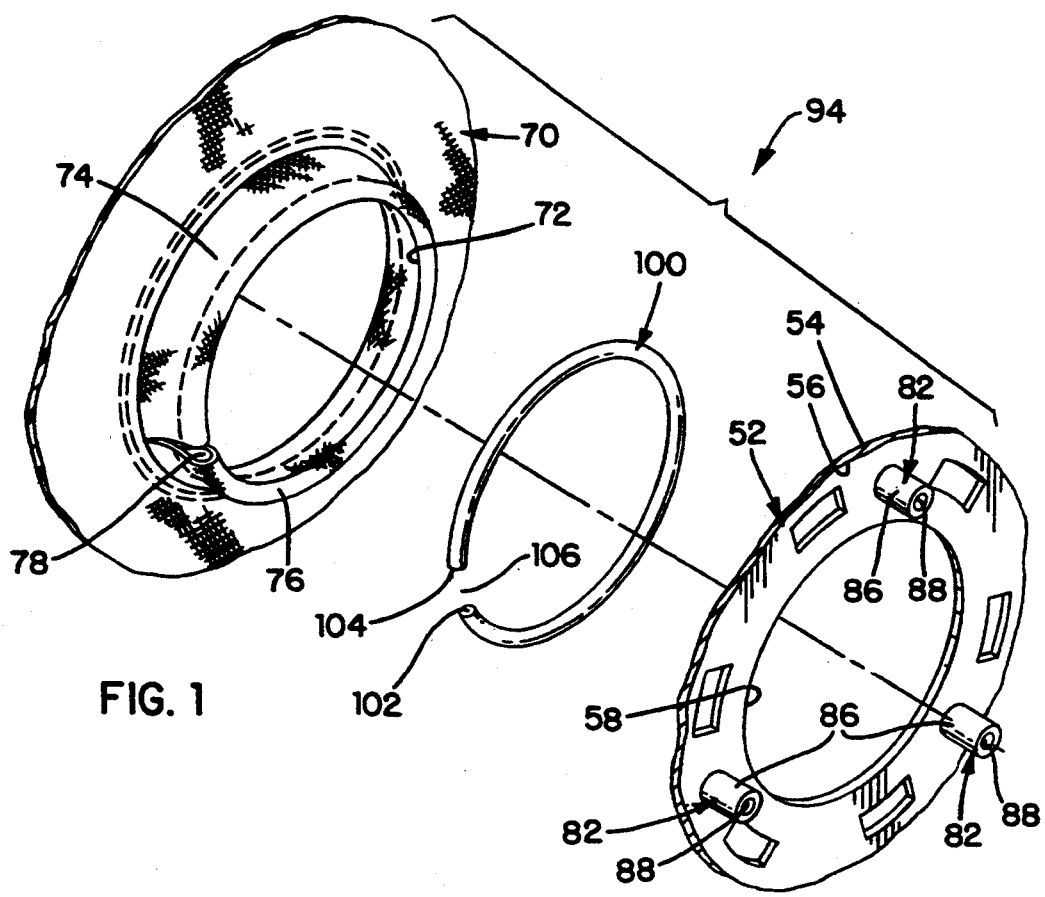
FIG. 1 is an exploded rear perspective view of an air bag subassembly including a retainer plate, a retainer ring, and an air bag, and showing the retainer plate and air bag partially-broken away.

Referring to FIGS. 1 and 3, the retainer plate 52 is generally sized and shaped similar to the support plate 28. The retainer plate 52 includes a top side 54, an opposite bottom side 56, and a centrally located circular plate opening 58 extending therethrough which has a diameter sized slightly larger than the inflator 60. The retainer plate 52 includes three apertures 80 which are matably aligned with respective hub openings 34 and support openings 32.

Each of the three apertures 80 supports an annular mounting member 82 inserted therein via the top side 54 of the retainer plate 52. As best shown in FIG. 3, each annular mounting member 82 has a head portion 84 sized larger than the aperture 80 for engaging the top side 54 of the retainer plate 52, and each has a cylindrical body portion 86 extending through the aperture 80 towards the support plate 28 and having a length such that a distal end of the mounting member 82 proximately abuts the support plate 28. The mounting members 82 are axially aligned with the respective hub openings 34 and support openings 32. Each distal end of a mounting member 82 includes a threaded axial aperture 88 therein for receiving fasteners, such as screws 90, to secure the retainer plate 52 to the support plate 28, as will be described further hereinafter.

Referring to FIG. 3, the module 50 includes an inflator 60 for generating gas to inflate the air bag 70 when the inflator 60 receives a predetermined signal from a vehicle sensor, not shown. The inflator 60 has a generally circular shape and may be of a conventional construction for discharging gas such as through ports 62 to inflate the air bag 70. The inflator 60 includes a peripheral inflator flange 64 extending outwardly therefrom which may be integral with the inflator 60 or attached thereto such as by flange fasteners 66. The inflator flange 64 underlies and is secured to the retainer plate 52, such as by plate fasteners 68, to centrally mount the inflator 60 within the plate opening 58 of the retainer plate 52.

Figure 2:
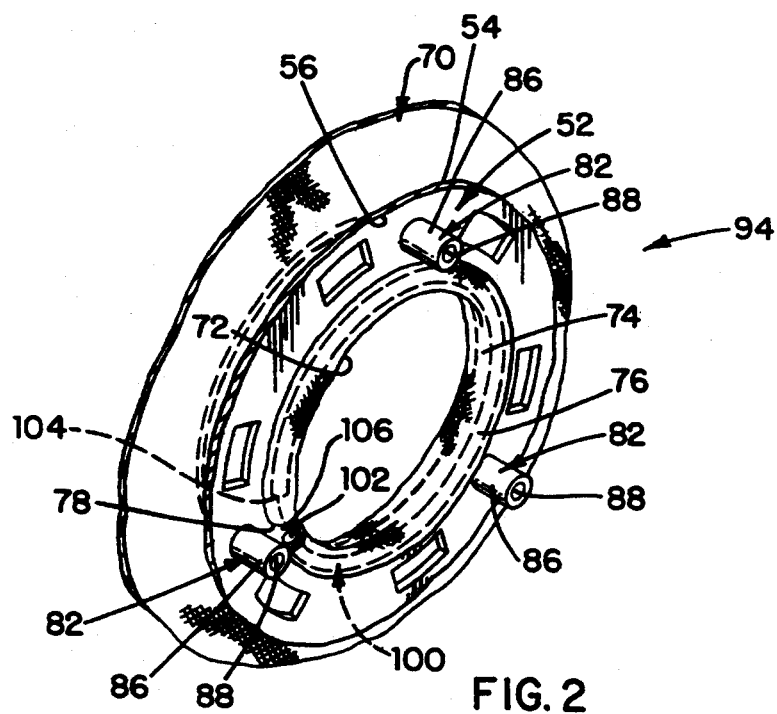
FIG. 2 is a view similar to FIG. 1 showing the air bag subassembly in the assembled condition.

Referring to FIGS. 1-3, the air bag 70 is generally of a conventional construction and is normally stored in a folded condition. The air bag 70 includes a generally circular bag opening 72 surrounded by an air bag mouth portion 74 including a peripheral hem portion 76 formed by appropriately folding and stitching the air bag material. As shown in FIGS. 1 and 2, the hem portion 76 includes a slitted opening 78 for permitting access inside the hem portion 76, as will be further described hereinafter. The bag opening 72 of the folded air bag 70 is sized for receiving the inflator 60 partially therein, and a heat shield (not shown) is preferably sewn into the mouth portion 74 to protect the air bag 70 from heat typically generated by the inflator 60 during air bag inflation. The hem portion 76 may also be made of a heat resistant material.

Referring to FIGS. 1-3, a discontinuous, flexible, resilient, circular, retainer ring 100 is preferably constructed of a relatively inexpensive wire material. The ring 100 is located within the hem portion 76 of the air bag by slip-fitted insertion therein via the slitted opening 78. As best shown in FIG. 1, the ring 100 has a normal or relaxed position in which a first end 102 and a second end 104 of the ring 100 are circumferentially spaced apart to form an open circumferential gap 106 in the ring 100 such that the ring 100 has a diameter greater than that of the plate opening 58. The ring 100 is easily manually deformable to a deformed position, not shown, in which the first and second ends 102, 104 are positioned circumferentially closer together thereby reducing, or preferably closing, the circumferential gap 106 so that the ring 100 has a diameter less than that of the plate opening 58 whereby the ring 100 and hem portion 76 of the air bag 70 are insertable through the plate opening 58.

Referring to FIGS. 1 and 2, the module 50 includes an air bag subassembly 94 comprising the retainer plate 52, the mounting members 82, and the ring 100 which is assembled as follows. First, each of the three mounting members 82 are inserted through respective apertures 80 on the retainer plate 52. Next, the ring 100, being in the relaxed position, is slip-fittedly inserted into the hem portion 76 of the air bag 70 via the slitted opening 78 by threading the ring 100 therein with either the first end 102 or second end 104 of the ring 100 leading. The ring 100 contained within the hem portion 76 is manually deformed to a deformed position in which the first and second ends 102, 104 are circumferentially moved closer together to reduce, or preferably close, the circumferential gap 106 so that the ring 100 has a diameter less than that of the plate opening 58. While in the deformed position, the ring 100 and the attached hem portion 76 of the air bag 70 are inserted through the top side 54 of the plate opening 58, after which the ring 100 is released from its deformed position to resiliently return to its relaxed position in which the circumferential gap 106 is fully reopened, such that the ring 100 has a diameter greater than that of the plate opening 58. Upon return to the relaxed position, the ring 100 is captured beneath and engages the bottom side 56 of the retainer plate 52 such that the air bag 70 is anchored to the retainer plate 52 and removal of the ring 100 back through the plate opening 58 is prevented.

Upon completion of the air bag subassembly 94, the retainer plate 52 may be used to position and support the air bag 70 in a fixture, not shown, such that the folding operation of the air bag 70 may be easily accomplished.

Referring to FIG. 3, to complete assembly of the air bag module 50, the air bag subassembly 94 is inserted into the housing 40 and cover 42 after which the housing flanges 44 and cover flanges 46 are suitably secured to the retainer plate 52. Next, the inflator 60 is inserted into the bag opening 72 of the folded air bag 70 and is centrally positioned within the circular plate opening 58 of the retainer plate 52 after which the inflator flange 64 is secured to the retainer plate 52, such as by plate fasteners 68. Thus, the inflator 60, air bag 70, retainer ring 100, mounting members 82, housing 40, and cover 42 are modularized with the retainer plate 52 to provide the module 50.

Completion of the steering wheel assembly 10 is accomplished as follows. The assembled module 50 is centrally positioned on the hub portion 12 such that the mounting members 82 are aligned with respective hub openings 34 and support openings 32 of the hub portion 12. Screws 90 are then inserted in through the hub openings 34 and the support openings 32 and secured in the threaded axial apertures 88 of the mounting members 82 thereby mounting the air bag module 50 to the support plate 28 of the hub portion 12 to complete the steering wheel assembly 10.

It is noted that the annular mounting members 82 and screws 90 provide one example of fasteners used to mount the air bag module 50 to the hub portion 12, and many other types of existing fasteners may also be utilized for this purpose.

Upon actuation, the inflator 60 discharges inflator gas. The ports 62 of the inflator 60 direct the discharging inflator gas upwardly into the bag opening 72 to inflate the air bag 70 which will deploy out through the housing 40 and cover 42 in a well-known manner. During air bag 70 inflation, the ring 100 is in the relaxed position and has a ring 100 diameter greater than the diameter of the plate opening 58. The ring 100 engages the bottom side 56 of the retainer plate 52 to prevent removal of the ring 100 back through the plate opening 58 of the retainer plate 52 such that the air bag 70 is anchored to the retainer plate 52 during air bag 70 inflation.

Since the circular plate opening 58 in the retainer plate 52 has a diameter sized slightly larger than the inflator 60, it will be appreciated that the mouth portion 74 of the air bag 70 is captured between the retainer plate 52 and inflator 60 in the assembled condition of the module 50. It will further be appreciated that the inflator 60 and the circular plate opening 58 have a radial clearance therebetween which is preferably less than a cross-sectional dimension of the wire forming the ring 100, such that the ring 100 is trapped beneath the retainer plate 52 and additionally prevented from removal back out through the plate opening 58 during air bag 70 inflation.

It will be appreciated that the discontinuous ring 100 located within the hem portion 76 of the air bag 70 and having first and second ends 102, 104 being circumferentially spaced apart provides an improved mounting mechanism permitting simple attachment of the air bag 70 to the retainer plate 52 having a circular plate opening 58, without the use of fasteners. Thus, assembly time is reduced since the ring 100 may be quickly snapped in through the plate opening 58 to securely anchor the air bag 70 to the retainer plate 52 and to prevent removal of the ring 100 back through the plate opening 58.

Since many existing air bag modules include a retainer plate having a circular plate opening, this improved mounting mechanism utilizing a discontinuous ring is advantageous since it may be utilized in existing air bag modules to eliminate the multiplicity of fasteners normally required for attaching the air bag to the retainer plate. As an additional advantage, the multiplicity of fastening apertures normally required in the retainer plate are also eliminated.

Furthermore, use of a discontinuous ring 100 to mount the air bag 70 to the retainer plate 52, as described above, allows the air bag 70 and retainer plate 52 to be a separate air bag subassembly 94 which facilitates the air bag 70 folding operation. In addition, the air bag 70 is securely anchored to the retainer plate 52 of the module 50 during air bag inflation.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

I claim:

1. In an air bag module having an air bag and a retainer plate including a circular plate opening, a mechanism for attaching the air bag to the plate comprising:

the air bag having a circular bag opening and a peripheral hem portion surrounding the bag opening; and a discontinuous circular ring located within the hem portion of the air bag and having a first end and a second end being circumferentially spaced apart to form a circumferential gap, the ring having a relaxed position in which the gap is fully open and the ring has a diameter greater than that of the plate opening, the ring having a deformed position in which the gap is reduced and the ring has a diameter less than that of the plate opening such that the ring and air bag are insertable through the plate opening;

whereby upon insertion of the ring through the plate opening, the ring reopens to the relaxed position such that the ring is captured beneath the plate to anchor the air bag to the plate and prevent removal of the ring back through the plate opening.

2. In an air bag module having an air bag and a retainer plate including a circular plate opening, a mechanism for attaching the air bag to the plate comprising:

the air bag having a circular bag opening and a peripheral hem portion surrounding the bag opening, the hem portion including a slitted opening for permitting access inside the hem portion; and a discontinuous circular ring having a first end and a second end being circumferentially spaced apart to form a circumferential gap, the ring located within the hem portion of the air bag by insertion therein via the slitted opening, the ring having a relaxed position in which the gap is fully open and the ring has a diameter greater than that of the plate opening, the ring having a deformed position in which the gap is reduced and the ring has a diameter less than that of the plate opening such that the ring and air bag are insertable through the plate opening;

whereby upon insertion of the ring through the plate opening, the ring reopens to the relaxed position such that the ring is captured beneath the plate to anchor the air bag to the plate and prevent removal of the ring back through the plate opening.

3. The mechanism of claim 2 wherein the air bag module includes a cylindrical inflator centrally mounted within the plate opening, the ring is a wire, and the inflator and the plate opening having a radial clearance therebetween that is less than a cross-sectional dimension of the wire forming the ring such that the ring and hem portion are trapped beneath the plate and the inflator upon insertion through the plate opening.

4. A method of assembling an air bag to a retainer plate which includes the retainer plate having a circular plate opening, the air bag having a circular bag opening and a peripheral hem portion surrounding the bag opening, the hem portion including a slitted opening for permitting access inside the hem portion, and a discontinuous circular ring having a first end and a second end being circumferentially spaced apart to form a circumferential gap, the ring having a relaxed position in which the gap is fully open and the ring has a diameter greater than that of the plate opening, the ring having a deformed position in which the gap is reduced and the ring has a diameter less than that of the plate opening, comprising the steps of:

a. inserting the ring into the hem portion of the air bag via the slitted opening, b. deforming the ring to the deformed position and inserting the ring and hem portion through the plate opening, c. releasing the ring to permit the ring to reopen to the relaxed position such that the ring is captured beneath the plate to anchor the air bag to the plate and prevent removal of the ring back through the plate opening.

* * * * *